United States Patent
Yang

(10) Patent No.: US 10,769,485 B2
(45) Date of Patent: Sep. 8, 2020

(54) FRAMEBUFFER-LESS SYSTEM AND METHOD OF CONVOLUTIONAL NEURAL NETWORK

(71) Applicant: HIMAX TECHNOLOGIES LIMITED, Tainan (TW)

(72) Inventor: Der-Wei Yang, Tainan (TW)

(73) Assignee: Himax Technologies Limited, Tainan (TW)

( * ) Notice: Subject to any disclaimer, the term of this patent is extended or adjusted under 35 U.S.C. 154(b) by 171 days.

(21) Appl. No.: 16/012,133

(22) Filed: Jun. 19, 2018

(65) Prior Publication Data
US 2019/0385005 A1 Dec. 19, 2019

(51) Int. Cl.
| | |
|---|---|
| *G06K 9/00* | (2006.01) |
| *G06K 9/62* | (2006.01) |
| *G06K 9/46* | (2006.01) |
| *G06N 5/04* | (2006.01) |
| *G06T 3/40* | (2006.01) |
| *G06T 7/11* | (2017.01) |

(52) U.S. Cl.
CPC ........... *G06K 9/4642* (2013.01); *G06N 5/046* (2013.01); *G06T 3/4046* (2013.01); *G06T 7/11* (2017.01); *G06T 2207/20104* (2013.01)

(58) Field of Classification Search
USPC .......................... 382/195, 103, 156, 190, 224
See application file for complete search history.

(56) References Cited

U.S. PATENT DOCUMENTS

| | | | | |
|---|---|---|---|---|
| 10,007,860 | B1 * | 6/2018 | Fotland ............... | G06K 9/3233 |
| 10,467,763 | B1 * | 11/2019 | Sun ......................... | G06T 7/251 |
| 2016/0371546 | A1 * | 12/2016 | Yadav ................... | G06K 9/6211 |
| 2018/0165548 | A1 * | 6/2018 | Wang .................... | G06N 3/0454 |
| 2018/0276841 | A1 * | 9/2018 | Krishnaswamy ......... | G06T 7/11 |
| 2018/0293737 | A1 * | 10/2018 | Sun ........................ | G06T 3/0093 |
| 2018/0300553 | A1 * | 10/2018 | Khosla ............... | G06K 9/00771 |
| 2018/0341872 | A1 * | 11/2018 | Wang ......................... | G06T 7/11 |
| 2019/0005657 | A1 * | 1/2019 | Gao ...................... | G06K 9/2054 |
| 2019/0026538 | A1 * | 1/2019 | Wang .................. | G06K 9/00261 |
| 2019/0050994 | A1 * | 2/2019 | Fukagai ............... | G06K 9/3233 |
| 2019/0073564 | A1 * | 3/2019 | Saliou ..................... | G06T 7/248 |
| 2019/0138676 | A1 * | 5/2019 | Akella ............... | G05B 19/4183 |
| 2019/0251383 | A1 * | 8/2019 | Senay ........................ | G06T 7/74 |

* cited by examiner

*Primary Examiner* — Kathleen Y Dulaney
(74) *Attorney, Agent, or Firm* — Donald E. Stout; Stout, Uxa & Buyan, LLP

(57) ABSTRACT

A framebuffer-less system of convolutional neural network (CNN) includes a region of interest (ROI) unit that extracts features, according to which a region of interest in an input image frame is generated; a convolutional neural network (CNN) unit that processes the region of interest of the input image frame to detect an object; and a tracking unit that compares the features extracted at different times, according to which the CNN unit selectively processes the input image frame.

15 Claims, 4 Drawing Sheets

| X | X | X | C | C | C |
|---|---|---|---|---|---|
| C | C | C | X | X | X |
| C | X | D | X | D | D |
| X | X | X | X | X | X |

*FIG. 4A*

| X | X | X | C | C | C |
|---|---|---|---|---|---|
| C | C | C | X | X | X |
| C | X | D | X | X | X |
| X | X | X | X | X | X |

*FIG. 4B*

FRAMEBUFFER-LESS SYSTEM AND METHOD OF CONVOLUTIONAL NEURAL NETWORK

BACKGROUND OF THE INVENTION

1. Field of the Invention

The present invention generally relates to a convolutional neural network (CNN), and more particularly to a CNN system without framebuffer.

2. Description of Related Art

A convolutional neural network (CNN) is a class of artificial neural networks that may be adapted to machine learning. The CNN can be applied to signal processing such as image processing and computer vision.

FIG. 1 shows a block diagram illustrating a conventional CNN 900 as disclosed in "A Reconfigurable Streaming Deep Convolutional Neural Network Accelerator for Internet of Things," entitled to Li Du et al., August 2017, IEEE Transactions on Circuits and Systems I: Regular Papers, the disclosure of which is incorporated herein by reference. The CNN 900 includes a single port static random-access memory (SRAM) as a buffer bank 91 to store intermediate data and exchange data with a dynamic random-access memory (DRAM) (e.g., double data rate synchronous DRAM (DDR SDRAM)) as a framebuffer 92 required to store whole image frame for CNN operation. The buffer bank 91 is separated into two sets: an input layer and an output layer. The CNN 900 includes a column (COL) buffer 93 that is used to remap output of the buffer bank 91 to a convolution unit (CU) engine array 94. The CU engine array 94 is composed of a plurality of convolution units to enable highly parallel convolution computation. A pre-fetch controller 941 is included inside the CU engine array 94 to periodically fetch parameters from a direct memory access (DMA) controller (not shown) and update weights and bias values in the CU engine array 94. The CNN 900 also includes an accumulation (ACCU) buffer 95 with scratchpad used to store partial convolution results from the CU engine array 94. A max pool 951 is included in the ACCU buffer 95 to pool output-layer data. The CNN 900 includes an instruction decoder 96 used to store commands that are pre-stored in the framebuffer 92.

In the conventional CNN system as exemplified in FIG. 1, a framebuffer composed of a dynamic random-access memory (DRAM) (e.g., double data rate synchronous DRAM (DDR SDRAM)) is commonly required to store whole image frame for CNN operation. For example, framebuffer may occupy large space of 320×240×8 bits for an image frame with a 320×240 resolution. However, DDR SDRAM is not available for most low-power applications such as wearables or Internet of things (IoT). A need has arisen to propose a novel CNN system that is adaptable to low-power applications.

SUMMARY OF THE INVENTION

In view of the foregoing, it is an object of the embodiment of the present invention to provide a convolutional neural network (CNN) system without framebuffer. The embodiment is capable of performing CNN operation on high-resolution image frame with low system complexity.

According to one embodiment, a framebuffer-less system of convolutional neural network (CNN) includes a region of interest (ROI) unit, a convolutional neural network (CNN) unit and a tracking unit. The ROI unit extracts features, according to which a region of interest in an input image frame is generated. The CNN unit processes the region of interest of the input image frame to detect an object. The tracking unit compares the features extracted at different times, according to which the CNN unit selectively processes the input image frame.

BRIEF DESCRIPTION OF THE DRAWINGS

FIG. 4A shows an exemplary decision map composed of 4×6 blocks;

FIG. 4B shows another exemplary decision map updated after that in FIG. 4A;

DETAILED DESCRIPTION OF THE INVENTION

Figure 1:
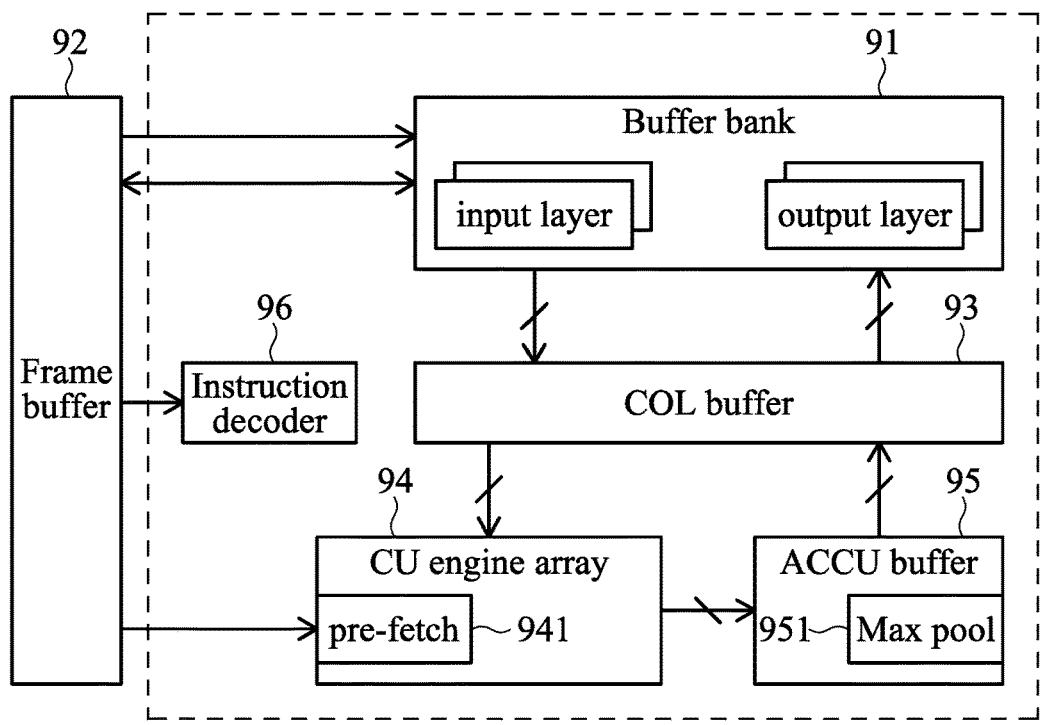
FIG. 1 shows a block diagram illustrating a conventional CNN.
Figure 2A:
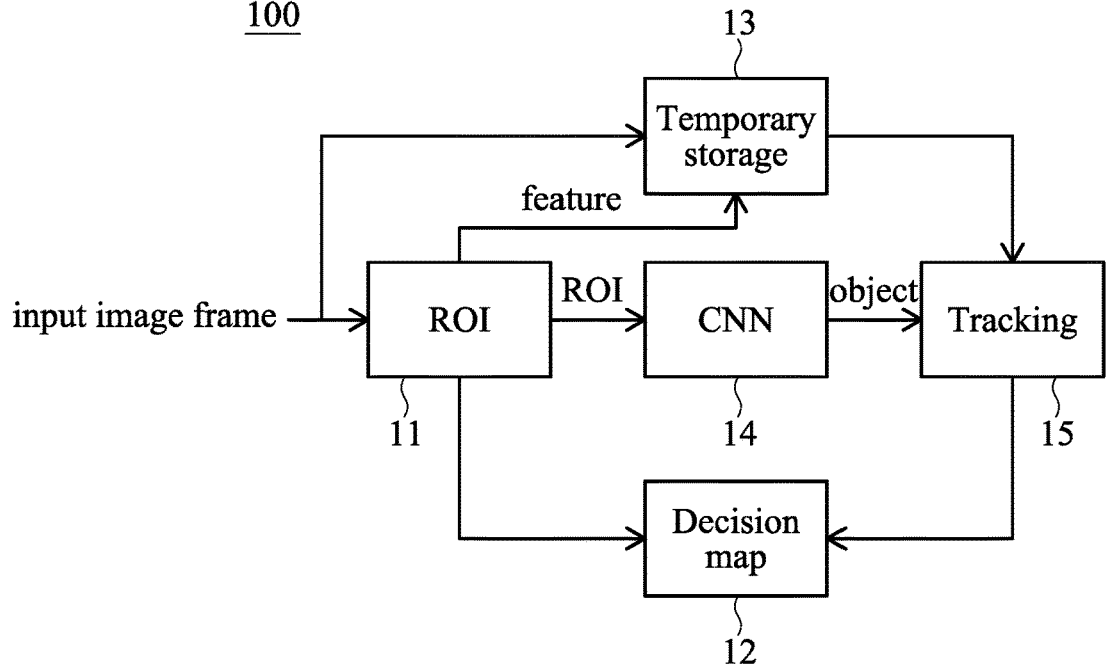
FIG. 2A shows a block diagram illustrating a framebuffer-less system of convolutional neural network (CNN) according to one embodiment of the present invention.
Figure 2B:
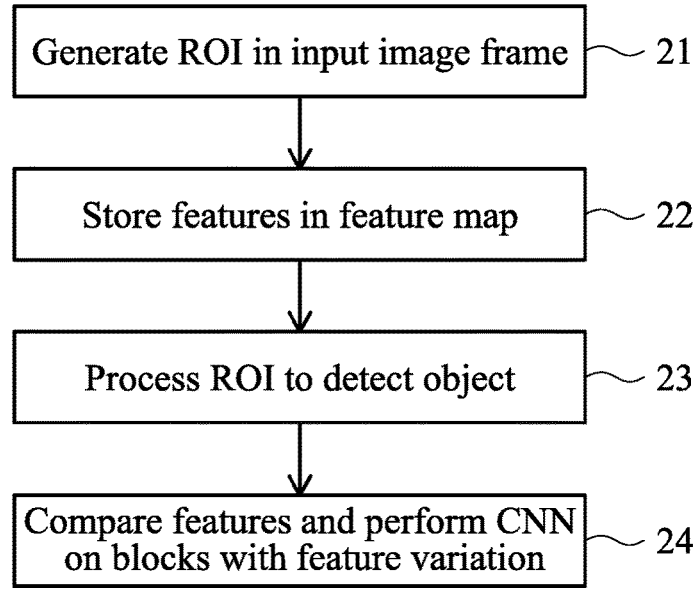
FIG. 2B shows a flow diagram illustrating a framebuffer-less method of convolutional neural network (CNN) according to one embodiment of the present invention.

FIG. 2A shows a block diagram illustrating a framebuffer-less system 100 of convolutional neural network (CNN) according to one embodiment of the present invention, and FIG. 2B shows a flow diagram illustrating a framebuffer-less method 200 of convolutional neural network (CNN) according to one embodiment of the present invention.

In the embodiment, the system 100 may include a region of interest (ROI) unit 11 configured to generate a region of interest in an input image frame (step 21). Specifically, as the system 100 of the embodiment contains no framebuffer, the ROI unit 11 may adopt scan-line based technique and block-based scheme to find the region of interest in the input image frame, which is divided into a plurality of blocks of image arranged in a matrix form composed of, for example, 4×6 blocks of image.

Figure 3:
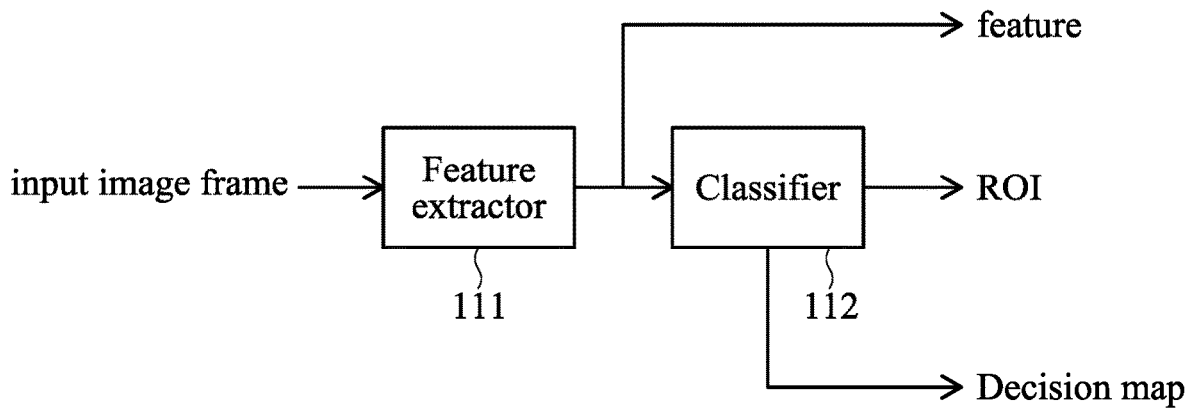
FIG. 3 shows a detailed block diagram of the ROI unit of FIG. 2A.

In the embodiment, the ROI unit 11 is configured to generate block-based features, according to which decision of whether to perform CNN is made for each block of image. FIG. 3 shows a detailed block diagram of the ROI unit 11 of FIG. 2A. In the embodiment, the ROI unit 11 may include a feature extractor 111 configured to extract, for example, shallow features from the input image frame. In one exemplary embodiment, the feature extractor 111 generates (shallow) features of the blocks according to block-based histogram. In another exemplary embodiment, the feature extractor 111 generates (shallow) features of the blocks according to frequency analysis.

The ROI unit 11 may also include a classifier 112, such as support vector machine (SVM), configured to make decision whether to perform CNN for each block of the input image frame. Accordingly, a decision map 12 composed of a plurality of blocks (e.g., arranged in a matrix form) representing the input image frame is generated. FIG. 4A shows an exemplary decision map 12 composed of 4×6 blocks, where X indicates that associated block requires no CNN performance, C indicates that associated block requires CNN performance, and D indicates that an object (e.g., a dog) is detected in associated block. Accordingly, the ROI is determined and is thereafter subjected to CNN performance.

Figure 5:
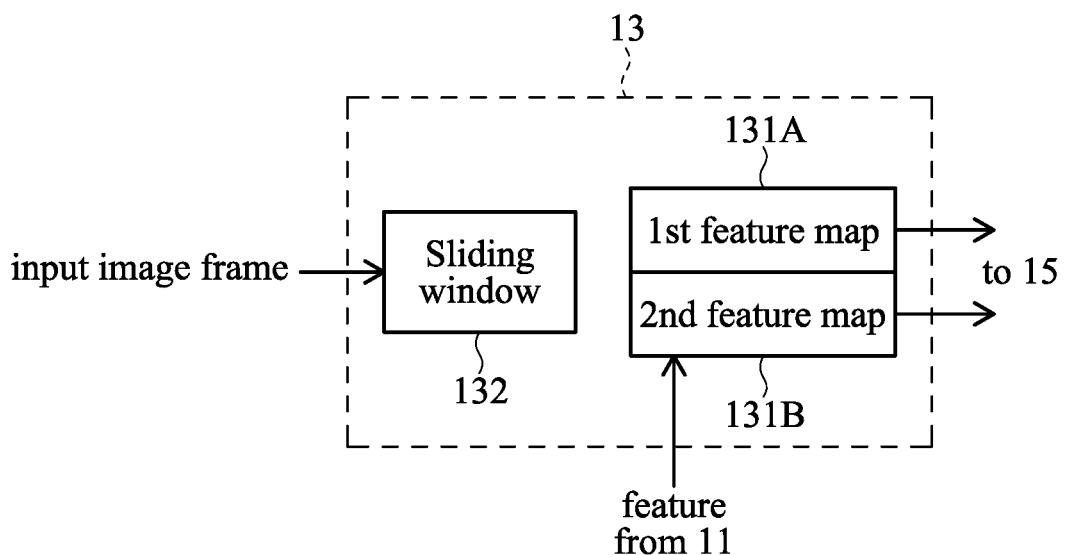
FIG. 5 shows a detailed block diagram of the temporary storage of FIG. 2A.

Referring back to FIG. 2A, the system 100 may include temporary storage 13 such as static random-access memory (SRAM), which is configured to store the (shallow) features generated by the feature extractor 111 (of the ROI unit 11) (Step 22). FIG. 5 shows a detailed block diagram of the temporary storage 13 of FIG. 2A. In the embodiment, the temporary storage 13 may include two feature maps 131—first feature map 131A used to store features of a previous image frame (e.g., at time t−1) and second feature map 131B used to store features of a current image frame (e.g., at time t). The temporary storage 13 may also include a sliding window 132 of a size, for example, of 40×40×8 bits for storing a block of the input image frame.

Referring back to FIG. 2A, the system 100 of the embodiment may include a convolutional neural network (CNN) unit 14 that operatively receives and processes the generated ROI (from the ROI unit 11) of the input image frame to detect an object (step 23). Specifically, the CNN unit 13 of the embodiment performs convolution operation only on the generated ROI, instead of entire input image frame as in a conventional system with framebuffer.

Figure 6:
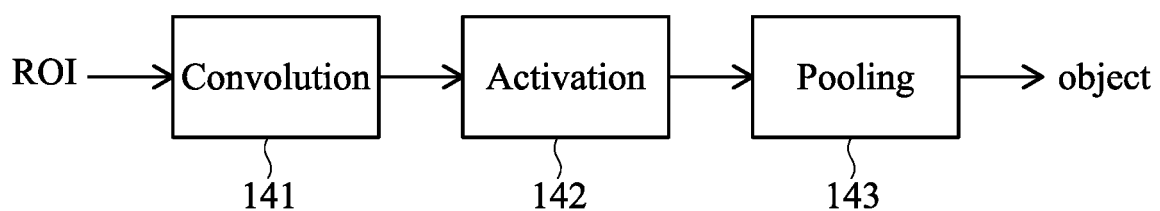
FIG. 6 shows a detailed block diagram of the CNN unit of FIG. 2A.

FIG. 6 shows a detailed block diagram of the CNN unit 14 of FIG. 2A. Specifically, the CNN unit 14 may include a convolution unit 141 including a plurality of convolution engines configured to perform convolution operation. The CNN unit 14 may include an activation unit 142 configured to perform activation functions when predefined features are detected. The CNN unit 14 may also include a pooling unit 143 configured to perform down-sampling (or pooling) on the input image frame.

The system 100 of the embodiment may include a tracking unit 15 configured, in step 24, to compare the first feature map 131A (of the previous image frame) and the second feature map 131B (of the current image frame), followed by updating the decision map 12. The tracking unit 15 analyzes content variation between the first feature map 131A and the second feature map 131B. FIG. 4B shows another exemplary decision map 12 updated after that in FIG. 4A. In this example, the object detected in the blocks located at columns 5-6 and row 3 at a previous time (designated D in FIG. 4A) disappears in the same blocks at a current time (designated X in FIG. 4B). According to feature variation (and constant), the CNN unit 14 need not perform CNN operation on those blocks without feature variation. Alternatively speaking, the CNN unit 14 selectively performs CNN operation only on those blocks with feature variation. Therefore, operation of the system 100 can be substantially accelerated.

According to the embodiment proposed above, the amount of CNN operation may be substantially reduced (and thus accelerated) compared with a conventional CNN system. Moreover, as the embodiment of the present invention requires no framebuffer, the embodiment can be preferably adaptable to low-power applications such as wearables or Internet of things (IoT). Regarding an image frame of a 320×240 resolution and a (non-overlap) sliding window of a size of 40×40, the conventional system with framebuffer requires 8×6 sliding window operations for CNN. To the contrary, only a few (e.g., less than ten) sliding window operations for CNN are required in the system 100 of the embodiment.

Although specific embodiments have been illustrated and described, it will be appreciated by those skilled in the art that various modifications may be made without departing from the scope of the present invention, which is intended to be limited solely by the appended claims.

What is claimed is:

1. A framebuffer-less system of convolutional neural network (CNN), comprising:
   a region of interest (ROI) unit that extracts features, according to which a region of interest in an input image frame is generated;
   a convolutional neural network (CNN) unit that processes the region of interest of the input image frame to detect an object;
   a tracking unit that compares features extracted at different times, according to which the CNN unit selectively processes the input image frame; and
   a temporary storage for storing the features extracted by the ROI unit;
   wherein the ROI unit adopts scan-line based technique and block-based scheme to find the region of interest in the input image frame, which is divided into a plurality of blocks of image;
   wherein the ROI unit comprises:
   a feature extractor that extracts the features from the input image frame; and
   a classifier that makes decision whether to perform CNN for each block of image, thus generating a decision map, according to which the region of interest is determined.

2. The system of claim 1, wherein the ROI unit generates block-based features, according to which decision of whether to perform CNN is made for each block of image.

3. The system of claim 1, wherein the feature extractor generates shallow features of the blocks of image according to block-based histogram or frequency analysis.

4. The system of claim 1, wherein the temporary storage comprises a first feature map storing features of a previous image frame, and a second feature map storing features of a current image frame.

5. The system of claim 4, wherein the tracking unit compares the first feature and the second feature map, and accordingly updates the decision map.

6. The system of claim 1, wherein the temporary storage comprises a sliding window storing a block of the input image frame.

7. The system of claim 1, wherein the CNN unit comprises:
   a convolutional unit including a plurality of convolution engines to perform convolution operation on the region of interest;
   an activation unit that performs activation function when predefined features are detected; and
   a pooling unit that performs down-sampling on the input image frame.

8. A framebuffer-less method of convolutional neural network (CNN), comprising:
   extracting features to generate a region of interest (ROI) in an input image frame;
   performing convolutional neural network (CNN) on the region of interest of the input image frame to detect an object; and
   comparing features extracted at different times and accordingly processing the input image frame selectively;
   wherein the ROI is generated by adopting scan-line based technique and block-based scheme, the input image frame being divided into a plurality of blocks of image;
   wherein the step of generating the ROI comprises:

extracting the features from the input image frame; and making decision by classification whether to perform CNN for each block of image, thus generating a decision map, according to which the region of interest is determined.

9. The method of claim 8, wherein the step of generating the ROI comprises:

generating block-based features, according to which decision of whether to perform CNN is made for each block of image.

10. The method of claim 8, wherein the step of extracting the features comprises:

generating shallow features of the blocks of image according to block-based histogram or frequency analysis.

11. The method of claim 8, further comprising a step of temporarily storing the features that generates the ROI.

12. The method of claim 11, wherein the step of temporarily storing the features comprises:

generating a first feature map storing features of a previous image frame; and generating a second feature map storing features of a current image frame.

13. The method of claim 12, wherein the step of comparing the features comprises:

comparing the first feature and the second feature map, and accordingly updating the decision map.

14. The method of claim 11, wherein the step of temporarily storing the features comprises:

generating a sliding window storing a block of the input image frame.

15. The method of claim 8, wherein the step of performing convolutional neural network (CNN) comprises:

using a plurality of convolution engines to perform convolution operation on the region of interest;

performing activation function when predefined features are detected; and performing down-sampling on the input image frame.

* * * * *